Patented Jan. 30, 1923.

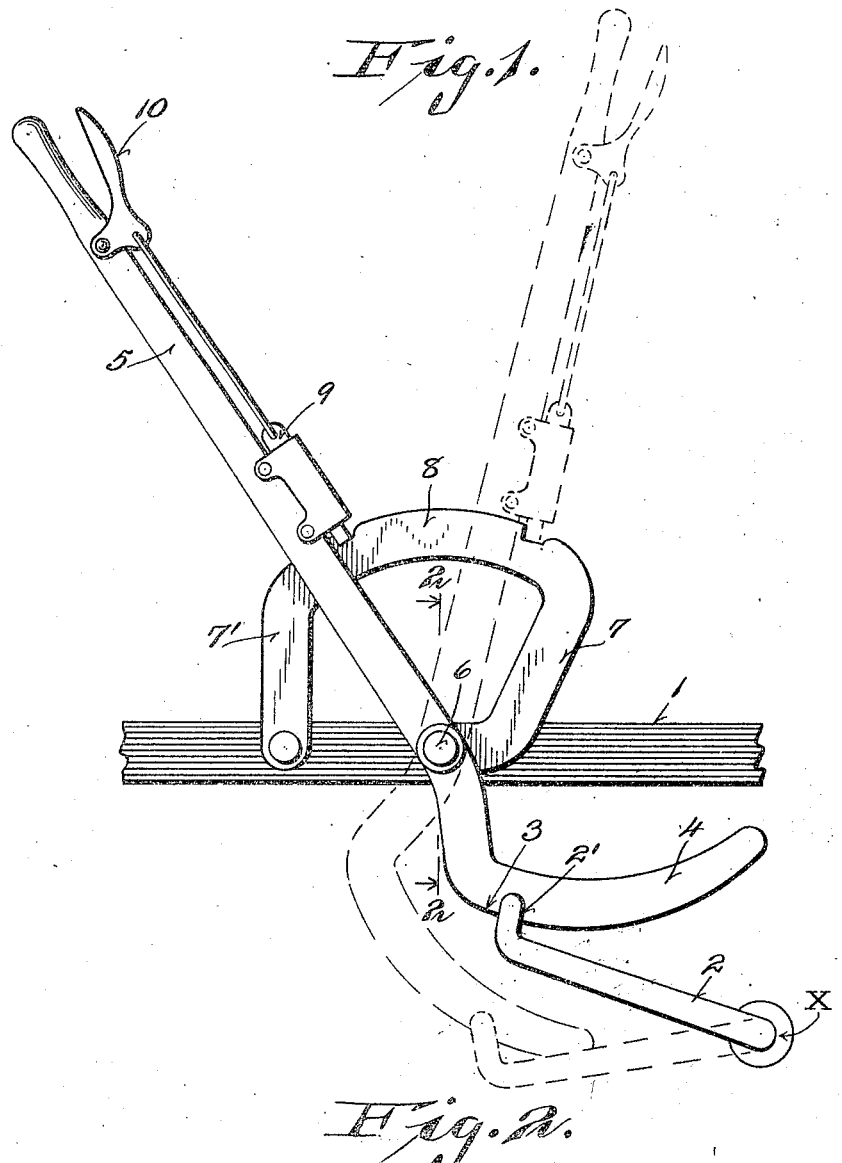

1,443,488

UNITED STATES PATENT OFFICE.

FREDERICK F. LUDWIG, OF NEW HOLSTEIN, WISCONSIN.

CLUTCH-OPERATING LEVER.

Application filed January 24, 1921. Serial No. 439,602.

*To all whom it may concern:*

Be it known that I, FREDERICK F. LUDWIG, a citizen of the United States, and resident of New Holstein, in the county of Calumet and State of Wisconsin, have invented certain new and useful Improvements in Clutch-Operating Levers; and I do hereby declare that the following is a full, clear, and exact description thereof.

My invention refers to hand controlled auxiliary lever attachments to the standard type of pedal levers for clutches of tractors or the like, and it has for its object to provide a simple, economical and effective auxiliary lever, wherein the same is detached from the pedal lever, but controls the same by a cam shoe which is positioned to slidingly engage the end of the actuating pedal, whereby the pedal is locked in its depressed position to free the clutch. It is understood that such pedals are brought to their normal clutch locking position by springs. In practice, it has been found exceedingly objectionable and impracticable to depend entirely upon a standard type of pedal lever for actuating the clutch, for the reason that the driver must hold the pedal down to free the clutch, and should occasion arise for the driver to leave the machine, the lever will automatically swing back to cause clutching engagement between the gears, whereby the tractor will start, should the engine be running.

With my simple lever attachment, the treadle can be depressed to any desired degree and held in such depressed position, due to its cam control.

With the above objects in view, the invention consists in certain peculiarities of construction, and combination of parts as are hereinafter set forth with reference to the accompanying drawings and subsequently claimed:

In the drawings:

Figure 1 represents a side elevation of an auxiliary lever adjusted in its proper relation to a pedal lever of a standard clutch mechanism not shown, and Figure 2 is a detailed cross section through the pivot point of the auxiliary lever and its detent, the section being indicated by line 2—2 of Figure 1.

Referring by characters to the drawings, 1 represents a frame beam constituting part of any tractor and 2 a pedal lever for actuating a standard clutch, not shown, the pedal lever being fulcrumed at $x$ in the ordinary manner. The free end of the pedal lever is formed with a stirrup 2' and when the clutch elements are locked, the pedal lever is in the position indicated in full lines. The pedal lever in this position is engaged by the heel portion 3 of a cam shoe 4, which cam shoe forms the lower arm of an auxiliary hand controlled lever 5. The hand lever 5 is fulcrumed upon a bolt 6, which bolt, in this instance, also passes through an arm 7 of a locking sector 8, the bolt being shouldered to prevent binding of the lever and secured to the frame member 1 by a suitable nut 6'. The locking sector 8 is anchored to the frame member 1 by a second arm 7', as shown, whereby it is rigidly secured. It is understood, however, that the sector may be secured in various other ways to the frame of the tractor without departing from the spirit of my invention.

The long arm of the auxiliary lever carries a standard locking plug 9, which is controlled by a grip lever 10. As shown in full lines, the auxiliary lever and pedal lever are in their normal positions with relation to each other, in which positions the clutch is locked. To free the clutch, the operator moves the lever forward to position indicated in dotted lines, causing the cam shoe to slidingly engage the pedal stirrup from the heel portion of the shoe to its toe portion, whereby the stirrup is depressed to thus separate the clutch members and stop the tractor, for the time being, while the engine is running. By this cam shoe connection, it will be observed that a very slight hand power is required to manipulate the clutch and that the clutch will be held in any position desired, depending upon movement of the auxiliary lever. It will also be observed that the auxiliary lever may be locked in its extreme normal position, or in its extreme forward position, and furthermore, owing to the peculiar formation of the cam shoe, with relation to the fulcrum of the auxiliary lever and pedal, the parts will remain in any predetermined set position between the two extreme movements of the auxiliary lever.

By employing an auxiliary lever of this general type, it will be observed that it can be readily attached to a pedal lever without any physical connections thereto, whereby expense in installment is avoided, and it will also further be observed that the pedal lever can be actuated independent of the auxiliary lever, so that under ordinary conditions, when the driver remains in his seat, both hands are free, due to the fact that the pedal lever only is utilized for controlling the clutch.

I claim:

In a tractor, the combination of an oscillatory clutch actuating pedal, a sector bracket, a manually operable lever pivoted to said sector having an elongated cam shoe extending from the lower end thereof, said shoe having a curved lower face contacting with the actuating pedal, whereby on the movement of said lever, a movement of said pedal results, the curvature of said cam shoe face tending to make the angular movement of said pedal proportionate at all times to the angular movement of said lever.

In testimony that I claim the foregoing I have hereunto set my hand at Milwaukee, in the county of Milwaukee and State of Wisconsin.

FREDERICK F. LUDWIG.